United States Patent [19]
Henningsson et al.

[11] Patent Number: 5,469,607
[45] Date of Patent: Nov. 28, 1995

[54] CLOTH HANGER CLIP

[75] Inventors: Göran Henningsson; Hans Andersson, both of Kinna, Sweden

[73] Assignee: Ludvig Svensson International B.V., Hellevoetsluis, Netherlands

[21] Appl. No.: 335,479

[22] Filed: Nov. 7, 1994

Related U.S. Application Data

[63] Continuation-in-part of Ser. No. 90,083, Aug. 4, 1993, abandoned.

[30] Foreign Application Priority Data

Jan. 24, 1991 [XH] Hague Agreement ... PCT/SE91/00050

[51] Int. Cl.⁶ ............................. A44B 13/00; A47H 1/00
[52] U.S. Cl. ............. 24/716; 24/338; 24/600.9; 24/601.2; 24/30.5 S
[58] Field of Search .................. 24/716, 601.2, 24/601.3, 600.9, 706.1, 30.5 S, 67.9, 545, 336, 337, 338; 16/87.2

[56] References Cited

U.S. PATENT DOCUMENTS

| | | |
|---|---|---|
| 713,418 | 11/1902 | Ferguson . |
| 1,698,796 | 1/1929 | Holmstrom . |
| 2,533,083 | 12/1950 | Blackburn . |
| 2,652,586 | 9/1953 | Ramsberger . |
| 3,408,701 | 8/1966 | Decker . |
| 3,689,957 | 9/1972 | Pizzurro . |
| 4,100,658 | 7/1978 | Nikota ........................... 24/601.3 |
| 4,464,813 | 8/1984 | Bakker et al. . |
| 4,691,416 | 9/1987 | Nakayama et al. . |
| 4,887,785 | 12/1989 | Blaich . |

FOREIGN PATENT DOCUMENTS

| | | |
|---|---|---|
| 1200629 | 7/1958 | France . |
| 1185785 | 1/1965 | Germany . |
| 1246188 | 8/1967 | Germany . |
| 2303729 | 8/1974 | Germany . |
| 2943743 | 5/1981 | Germany . |
| 3642344 | 6/1987 | Germany . |
| 3702556 | 7/1988 | Germany . |
| 3808686 | 9/1989 | Germany . |

Primary Examiner—Victor N. Sakran
Attorney, Agent, or Firm—Mathews, Woodbridge & Collins

[57] ABSTRACT

The present invention relates to a cloth hanger clip for holding a material in which a first resilient hook defines a material holding space an second resilient hook defines a wire holding space. The hooks are formed at ends of an intermediate portion. A recess is formed in the intermediate portion for receiving the tip of the first hook in which the recess is positioned outside of the material holding space.

7 Claims, 4 Drawing Sheets

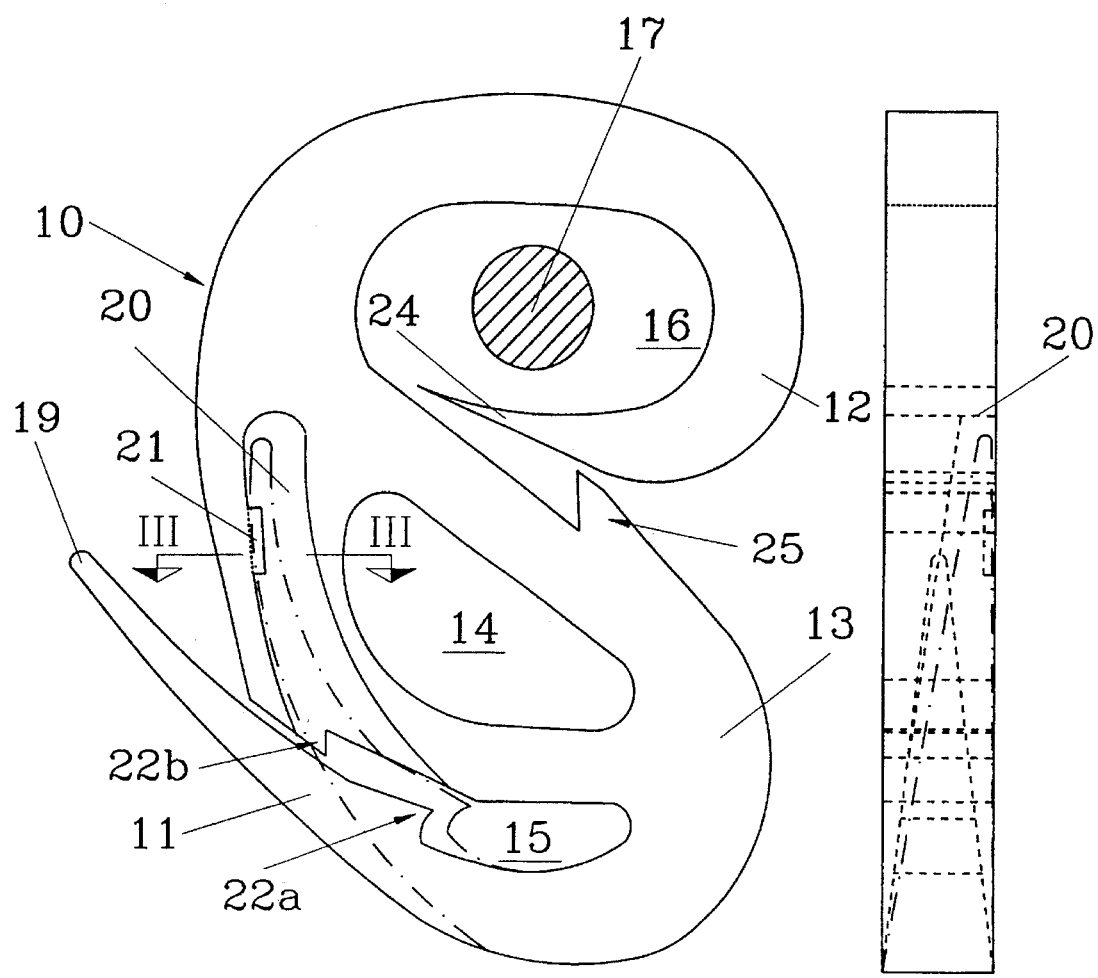
FIG. 1  FIG. 2
FIG. 3
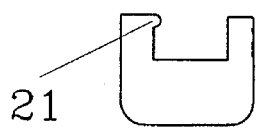

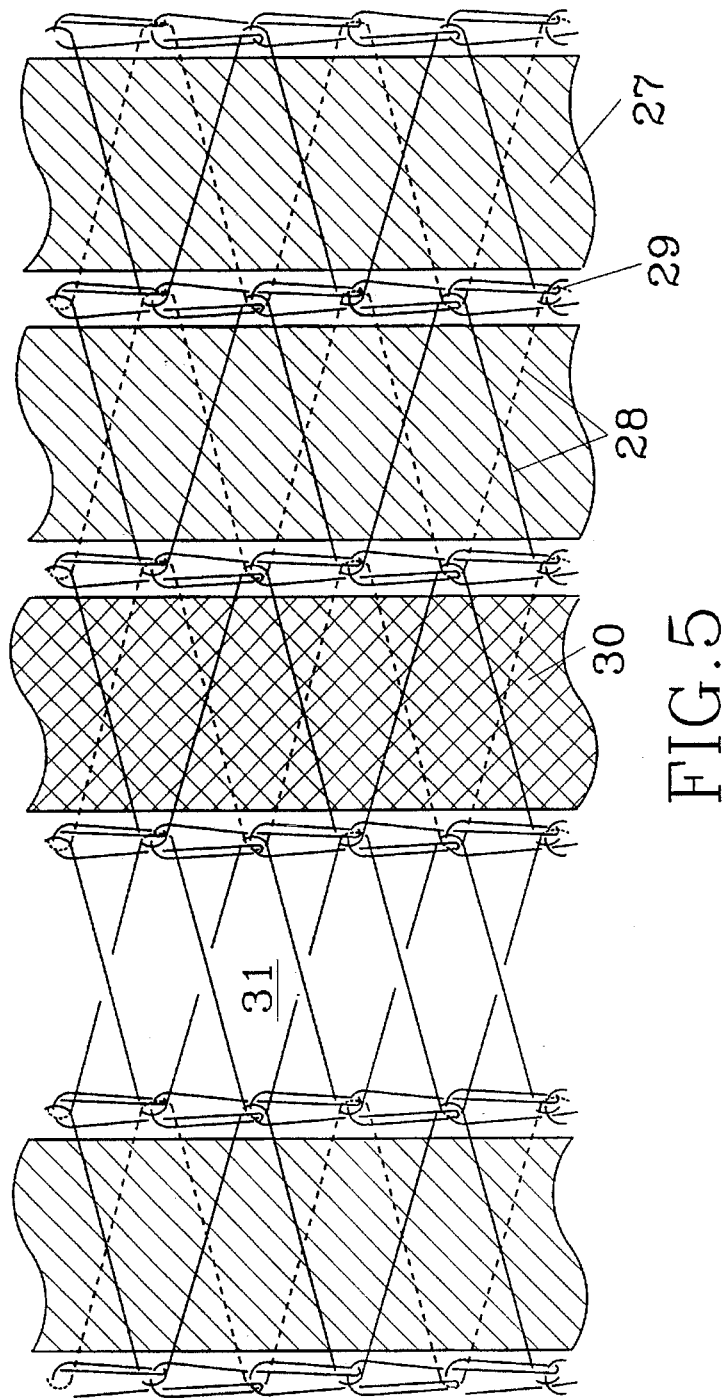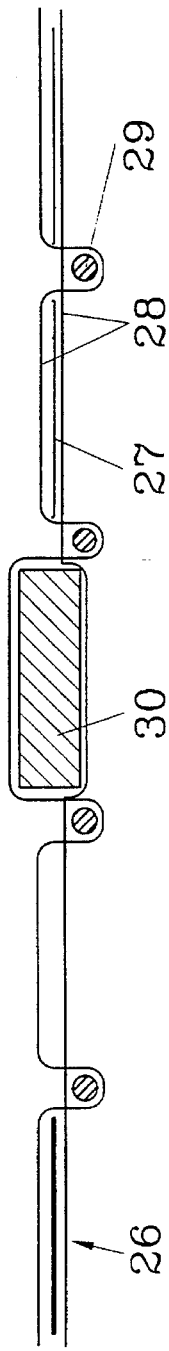
FIG. 4
FIG. 5

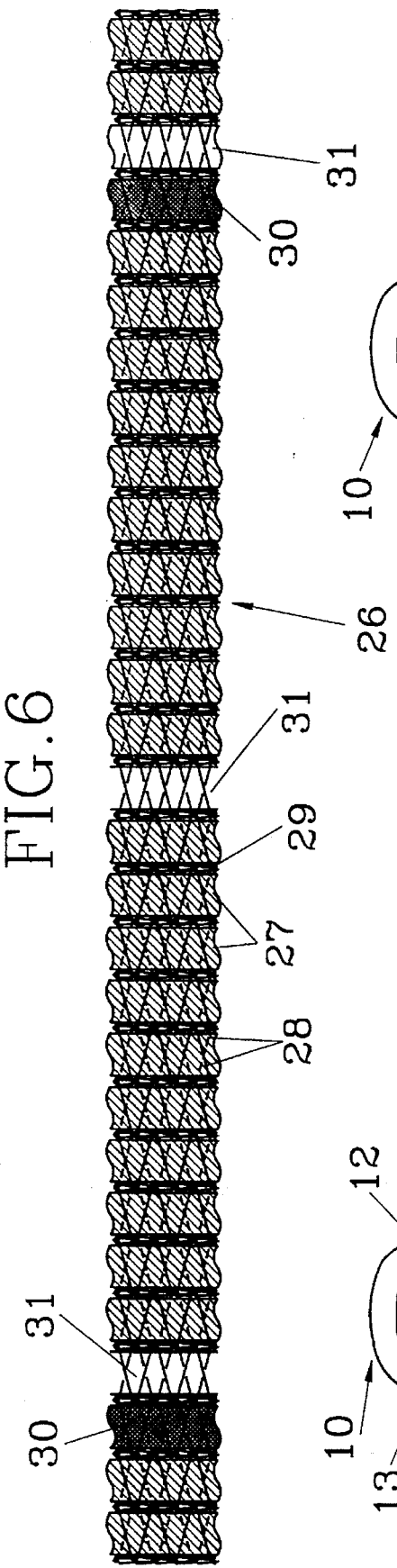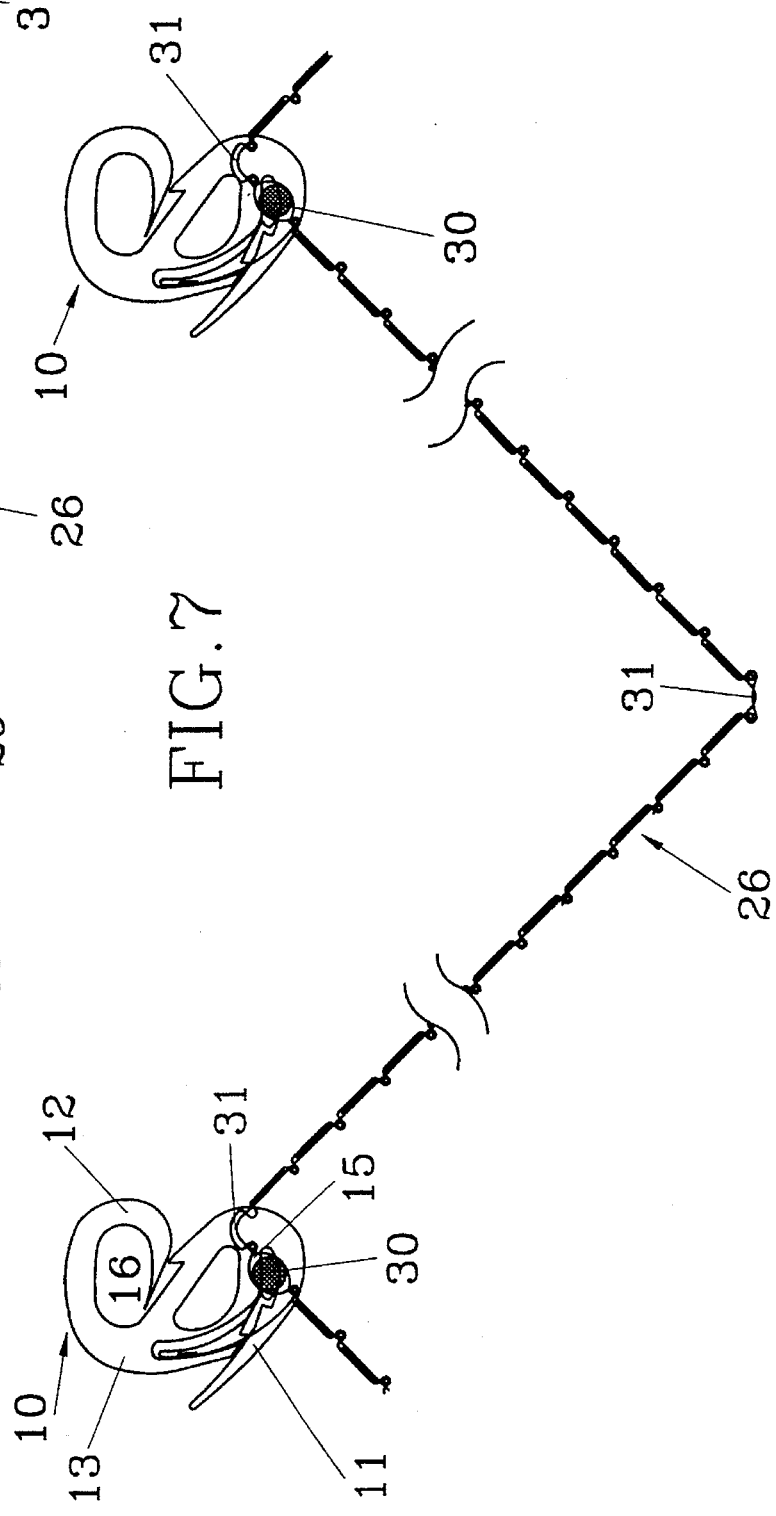

CLOTH HANGER CLIP

This Application is a Continuation-In-Part Application of U.S. application Ser. No. 08/090,083 which was filed on Aug. 4, 1993 now abandoned.

BACKGROUND OF THE INVENTION

1. Field of the Invention

The present invention refers to a cloth hanger clip with two hooks for holding a material, such as a curtain, a screen or the like, and for connecting it to a wire. The first hook defining a material holding space and the second hook defining a wire holding space. The clip comprising a substantially S-shaped configuration with both hooks in their open position, an intermediate portion having a first and a second resilient hook provided one at each end of said intermediate portion, each hook defining in its closed state a substantial closed loop-shaped holding space, said first hook having a root and a tip. The tip can be deflected to be received in a recess of the intermediate portion so that the first hook in its closed position defines a closed oblong material holding space with entrances and exits.

2. Description of the Related Art

There are previously known substantially S-shaped clips of this kind, which are especially intended for connecting screens of considerable lengths, tenths or hundreds of meters, e.g., greenhouse screens or shading hall screens, to a supporting wire. One of the hooks of the clip has a pointed tip which can penetrate the screen material and the other hook is snapped on the wire.

One problem with this conventional clip is that movements of the screen can cause the material to slip off the hook. The material is also easily damaged by the pointed tip at such movements. Besides the material is exerted to wear by on one hand the clip due to insufficient clamping of the material in the hook and on the other hand by the wire due to insufficient distance therebetween. Another problem is that the hook is easily unhooked from the wire.

German Patent 1,185,785 to Schaller was cited in the prosecution of the parent application. This patent relates to a cloth hanger clip having a resilient hook. A material holding space within the hook can be closed by engaging the tip of the hook in a recess. However, the Schaller hook does not describe clamping of material within the hook. Further, Schaller does not describe a recess outside the hook for receiving the tip of the hook. Accordingly, if sufficient material was inserted into the hook holding space, the tip of the hook would be excessively difficult to engage in the recess.

U.S. Pat. No. 4,887,785 to Blaich, cited in the parent application, relates to a hanger having a modified "S" shape. The hook has a lower open loop providing a bite for receiving therein the circular portion of a bird feeder or plant hanger. Blaich does not teach a clamped material holding space or a clamped wire holding space.

German Patent 1,246,188, cited in the parent application, relates to a first hook with a stop means for preventing material from slipping out. This patent does not teach a clamped material holding space having a tip engaging a recess outside the holding space and a clamped wire holding space.

German Patent 3,702,556, cited in the parent application, describes a fabric for use as a curtain, a screen or the like that is made of alternating strips of a more or less flexible sheet material which hang vertically by means of a knot detailed hanger clip so that it can be folded easily. The strips are arranged in a horizontal direction. The '556 patent has the limitation of not preventing sliding movements of the material in the clip for avoiding the material wearing and tearing.

SUMMARY OF THE INVENTION

One object of the invention is to provide a cloth hanger clip of the kind mentioned above which overcomes these problems and safely fixes the material and prevents it from slipping off the hook. This has been obtained by the fact that when said first hook is changed from an open position to a closed position a clamping effect is exerted on the material held in the material holding space and that the recess is situated outside the closed material holding space in the intermediate portion.

Another object is to provide a fabric for use with the clip. The fabric comprising strips of flexible sheet material extending at least in the longitudinal direction of the fabric. At certain intervals the strips are substituted for reinforcing slips of a stronger material than the strips, and that adjacent said reinforcing slips at least one space is arranged, along which the fabric is easily folded, said clip in use position being attached to a reinforcing clip, which is held in the material holding space of the clip.

BRIEF DESCRIPTION OF THE DRAWINGS

The invention will be more fully described with reference to an embodiment shown in the accompanying drawings.

FIG. 1 is a side view on an enlarged scale of a cloth hanger clip according to the invention.

FIG. 2 is a front view of the clip.

FIG. 3 is a section according to the wire III—III in FIG. 1.

FIG. 4 shows on an enlarged scale the mesh pattern of a warp-knitted fabric intended to be used with the cloth hanger clip according to the invention.

FIG. 5 shows on an enlarged scale and schematically a cross-section through the fabric in FIG. 4.

FIG. 6 shows a view of a piece of fabric according to the invention.

FIG. 7 is a cross-section according to FIG. 6 but shows the fabric folded with cloth hanger clips applied to the fabric.

DESCRIPTION OF EMBODIMENTS

Figure 8:
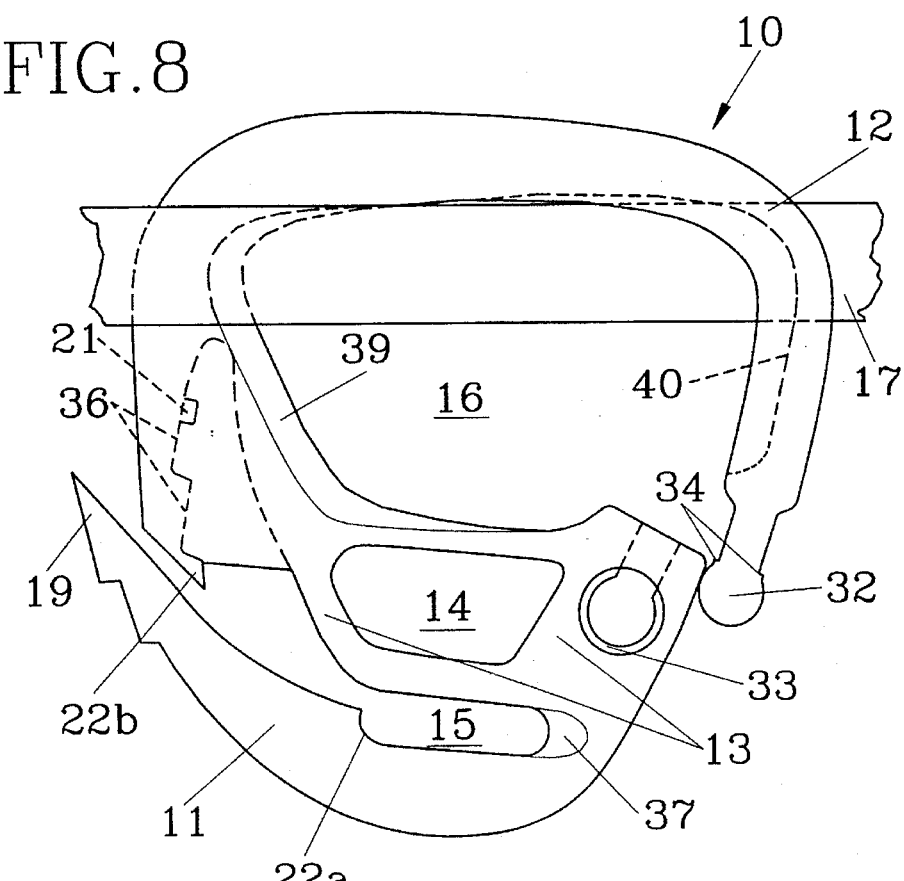
FIG. 8 is a side-view on an enlarged scale of a cloth hanger clip according to the preferred embodiment of the invention.

The cloth hanger clip 10 disclosed in FIG. 1 has a substantially S-shaped configuration with a hook-shaped portion 11 and 12 in each end and an intermediate portion 13 therebetween. The intermediate portion 13 has a hole 14 therein, which however has no special function except for material-saving reasons. The first hook 11 defines a material-holding space 15 in which the material 26, e.g., a greenhouse or shading hall screen, is suspended, and the second hook 12 defines a wire-holding space 16 for a supporting wire 17. The clip is preferably made of a plastic material which provides a certain flexibility to the hooks 11, 12.

The first hook 11 has a tip 19 which can penetrate the material 26. The tip 19 may be deflected from the position shown with continuous lines in FIGS. 1 and 2 to a position in which it is received in a recess 20 in the intermediate portion 13. The tip 19 is locked in the recess 20 behind a stop lug 21. Instead of a stop lug the recess 20 may be provided with a back draught for locking the tip 19 therein. In this position, which is shown with dotted lines in FIGS. 1 and 2, the first hook-shaped portion 11 defines a closed oval space 15 from which the material is prevented to slip out. The tip 19 which is received in the recess 20 outside the closed space 15, can not cause any damages on the material. The space 15 is in a closed position small enough to exert a certain clamping effect on the material 26 held therein. Thereby sliding movements of the material in the clip, which causes wear of the material are avoided or at least reduced. This is especially important for outdoor use, such as for shade-hall screens, where the material is exposed to wind and weather. For these applications, a firm clamping of the material is more important than for indoor use in, e.g., greenhouses.

Barbs 22a and b are provided in the entrance to the space 15 on either sides thereof, which are intended to prevent the material 18 to slip out of the space 15 when the tip 19 of the hook 11 is in open position. One of the barbs 22a which is located adjacent to the space 15 has a curved surface making an end termination of the space 15 in closed position of the tip 19 of the hook 11.

The second hook 12 defines a wire-holding space 16 into which a supporting wire 17 can be slipped while slightly deflecting the tip portion 24 of the hook 12. The tip portion 24 is curved inward so that it extends into the space 16, where it together with a shoulder 25 provided at the entrance to the space 16 provides a labyrinth-shaped exit therefrom, so that unintentional slipping out of the wire 17 is prevented. The distance between the wire-holding space 16 and the material-holding space 15 is large enough to prevent avoid wear of the material against the wire.

In FIG. 4 there is shown on an enlarged scale the mesh pattern of a warp-knitted fabric 26 for use as a greenhouse or shade hall screen. The fabric 26 comprises narrow strips 27 of foil, e.g., Al, or plastic film, which are interconnected by textile or plastic threads in a yarn framework including transverse connection threads 28 and longitudinal connection threads 29 located adjacent to the interval between strips 27. The longitudinal threads 29 are preferably in the form of so called pillar stitches, which provide a very rigid and inelastic structure keeping the strips 27 in place. The material in the threads 28 and 29 may be e.g., a flat, round mono- or multifilament synthetic yarn. The interval between the strips 26 have been exaggerated in order to make the mesh pattern more clear. In reality, the strips 27 are preferably located closely.

At certain intervals the strips are substituted for reinforcing slips 30 of relatively rigid and strong plastic or metallic material, e.g., a wire, plastic strip or group of multifilament yarn, and which can have different cross-sections, e.g., rectangular, round or oval. The space 31 on one of the sides of the reinforcing slip 30 is empty, i.e., strip-free, or is alternatively semi-filled with a narrower strip, so that the fabric is more pliable and easily folded along said space 31. The threads 28, 29 on either sides of the reinforcing slips 30 and in the pliable space 31 are preferably of a softer, more pliable material than in the rest of the fabric, in order to facilitate folding.

As shown in FIGS. 6 and 7, reinforcing slips 30 are arranged adjacent every other pliable space 31, i.e., at the folding that are intended to be suspended in a supporting wire. In fabrics used for e.g. shade hall screens, which should admit more ventilation than e.g. a greenhouse screen, strip-free or semi-filled spaces 31 are arranged also between the folding, so may e.g. every second or third space between the longitudinal connection threads 29 be strip-free or semi-filled. Clips 10 are attached to the fabric 26 at the folding provided with reinforcing slips 30. The first hook 11 is passed through the space 31, under the reinforcing slip 30 and up through the interval between the reinforcing slip 30 and the adjacent strip 27. The reinforcing slip 30 fills out an essential part of the material holding space 15 so that a certain clamping effect is exerted thereon by the clip 10. In FIG. 7 the clips 10 are for the sake of clarity shown in a front view located perpendicular to the plane of the fabric 26. In reality, when the second hook 12 of the clip 10 is attached to a supporting wire extending parallel to the pliable spaces 31 of the fabric 26, it will be turned about 45% with respect to the plane of the fabric.

Figure 9:
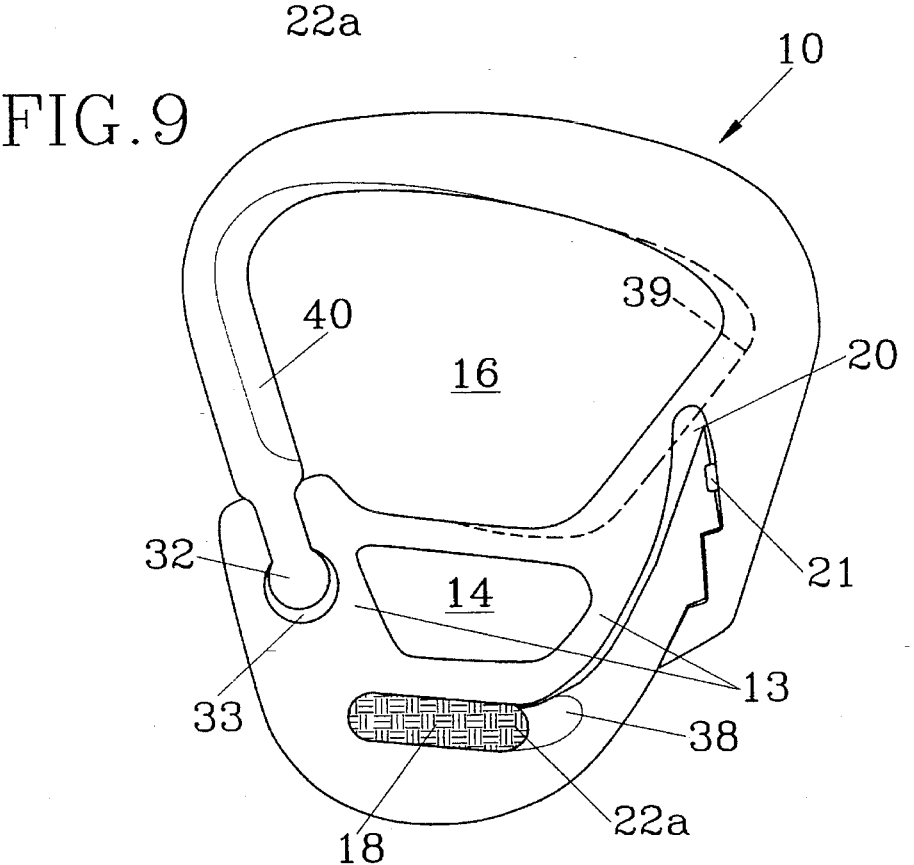
FIG. 9 is the other side-view of the cloth hanger clip shown in FIG. 8.

As shown in FIGS. 8 and 9, the cloth hanger clip of the preferred embodiment differs from the clip shown in FIG. 1 mostly by the second hook 12, the tip 32 of which is designed to be received in a second recess 33 arranged in the intermediate portion 13, so that a closed loop-shaped wire holding space is defined. The tip 32 of the second hook 12 is cylinder-shaped and is provided with protrusions 34 small enough to let the tip 32 slide into the recess 33 which is in the form of a cylinder-shaped through-hole with two different diameters so that these protrusions can grip on the side of it, locking the tip 32 in a closed position. The tip 19 of the first hook 11 is also provided with locking means 35, in the form of saw-teeth arranged along the end of it and designed to be received by corresponding saw-teeth 36 arranged on the side of the recess 20, so that the first hook 11 is prevented from unintentionally opening when submitted to vertical forces, such as the weight of the cloth.

Another feature made apparent in FIG. 8 and 9 is the chamfering done on the diametrically opposite sides of both hooks where the material 18 and the wire 17 come in contact with their respective hooks 11 and 12, each one exerting a torque in a direction opposite to the other, so that both hooks will be maintained in a closed position. In its final position, the material 18 rests on the sides 37 and 38 of the first hook 11, preventing its tip 19 from leaving its recess 20, while simultaneously the wire 17 rests on the sides 37 and 40 of the second hook 12, preventing its tip 32 from leaving its recess 33. Both hooks are thus prevented from unintentionally opening.

The invention is, of course, not limited to the embodiment described above and shown in the drawings. The clip may be used with other types of fabrics than the one disclosed, so may, e.g., the fabric consist of strips in both longitudinal and transverse direction at which the yarn framework can be eliminated.

We claim:

1. A cloth hanger clip for holding a material, such as a curtain, screen or the like and for connecting it to a wire, said clip comprising:

an intermediate portion having a first and second end;

a first resilient hook formed at said first end of said intermediate portion;

a second resilient hook formed one at said second end of said intermediate portion;

said clip having a substantially S-shaped configuration with said first and second hooks in their open position, said first hook defining a material holding space and said second hook defining a wire holding space; and a recess formed in said intermediate portion, said recess is formed on the intermediate portion from the side entrance into the material holding space;

said first hook being disposed to be received in said recess of said intermediate portion so that said first hook defines a closed oblong material holding space having parameters, such that when said first hook is moved from an open position to a closed position a clamping effect is exerted on the material held therein.

2. The cloth hanger clip apparatus of claim 1, wherein said entrances and exits of said material holding space and said wire holding space are provided with stop means for preventing said material and said wire respectively held by said clip from slipping out from their respective holding spaces.

3. The cloth hanger clip apparatus of claim 2 wherein said stop means for said material holding space is formed of at least one barb.

4. The cloth hanger clip apparatus of claim 3 wherein said stop means for said wire holding space is formed of shoulder.

5. The clip apparatus of claim 4 intended to be used with a fabric formed of strips of flexible sheet material, at least one pliable space is arranged adjacent said strips, along which pliable space the fabric is easily folded, said strips at certain intervals are substituted with reinforcing slips of a stronger material than said strips, said clip being attached to said reinforcing slip which is held in said material holding space of said clip and said reinforcing slips are dimensioned to fill out an essential part of the material holding space.

6. The clip apparatus as claimed in claim 5 wherein said pliable space adjacent said reinforcing slip is strip-free or semi-filled with a narrower strip as compared to the other strips.

7. The clip apparatus as claimed in claim 6 wherein said strips are interconnected by a yarn framework and said material in said pliable spaces is softer than in the rest of the fabric.

* * * * *